United States Patent
Bouchat et al.

(10) Patent No.: US 8,644,343 B2
(45) Date of Patent: Feb. 4, 2014

(54) METHOD FOR ESTABLISHING A PATH, HAVING A CERTAIN QOS-CLASS AND A RELATED ACCESS MULTIPLEXER

(75) Inventors: Christele Bouchat, Antwerpen (BE); Michel Ferdinand Pauline Tassent, Hamme (BE); Sven Jozef Jeanne Van Den Bosch, Loçchristi (BE)

(73) Assignee: Alcatel Lucent, Paris (FR)

( * ) Notice: Subject to any disclaimer, the term of this patent is extended or adjusted under 35 U.S.C. 154(b) by 839 days.

(21) Appl. No.: 10/886,606

(22) Filed: Jul. 9, 2004

(65) Prior Publication Data
US 2005/0013304 A1    Jan. 20, 2005

(30) Foreign Application Priority Data
Jul. 15, 2003  (EP) .................................... 03291755

(51) Int. Cl.
*H04J 3/24* (2006.01)
(52) U.S. Cl.
USPC .......................................................... 370/475
(58) Field of Classification Search
USPC .................................................. 370/351, 475
See application file for complete search history.

(56) References Cited

U.S. PATENT DOCUMENTS

| | | | | |
|---|---|---|---|---|
| 5,978,373 A * | 11/1999 | Hoff et al. | ...................... | 370/392 |
| 6,343,083 B1 * | 1/2002 | Mendelson et al. | .......... | 370/466 |
| 6,345,051 B1 * | 2/2002 | Gupta et al. | ............... | 370/395.2 |
| 6,505,255 B1 * | 1/2003 | Akatsu et al. | ................. | 709/239 |
| 6,993,026 B1 * | 1/2006 | Baum et al. | ................... | 370/392 |
| 7,215,670 B1 * | 5/2007 | Karlsson et al. | ........... | 370/395.1 |
| 2003/0177267 A1 * | 9/2003 | Orava et al. | .................... | 709/245 |
| 2004/0090970 A1 * | 5/2004 | Sanchez et al. | ............... | 370/397 |
| 2006/0203846 A1 * | 9/2006 | Davis | ............................. | 370/466 |
| 2007/0008942 A1 * | 1/2007 | Ocepek et al. | ................ | 370/338 |
| 2008/0175250 A1 * | 7/2008 | Chen et al. | ................. | 370/395.1 |
| 2008/0212598 A1 * | 9/2008 | Kolli et al. | ..................... | 370/409 |

OTHER PUBLICATIONS

M. MacGregor et al, "Enabling Subscriber-to-Subscriber Communication in an NBMA DSL Network", Proceedings of the World Multiconference on Systemics, Cybernetics and Informatics (SCI20002), Orlando, USA, vol. IV, Jly 2002, XP02270382.

* cited by examiner

Primary Examiner — Kwang B Yao
Assistant Examiner — Tung Q Tran
(74) Attorney, Agent, or Firm — Sughrue Mion, PLLC

(57) ABSTRACT

The present invention relates to a method for establishing a path, having a certain QOS-class, between a modem and an edge node over a communications network. The communications network comprises an Access Multiplexer and an Ethernet aggregation network, where the Access Multiplexer couples the modem to the Ethernet aggregation network. The modem is coupled to the Access Multiplexer over at least one ATM connection. The modem forwards an ARP request, that is received from a host terminal, for an address of the edge Node over an ATM having a certain QOS-class. The Access Multiplexer intercepts the ARP request that is forwarded by the modem and assigns a chosen address for the edge node based on information on the edge node that is contained in the ARP request. Subsequently, the Access Multiplexer includes this chosen address in an ARP reply. The modem receives the ARP reply that contains the address of the edge node on the ATM connection having the certain QOS class and the modem retrieves the address and subsequently stores this address together with an identification of the connection.

10 Claims, 2 Drawing Sheets

METHOD FOR ESTABLISHING A PATH, HAVING A CERTAIN QOS-CLASS AND A RELATED ACCESS MULTIPLEXER

The present invention relates to a method for establishing a QoS path between a modem and a service edge node over a communications network.

Such a communications network comprises an Access Multiplexer and an Ethernet aggregation network, wherein the Access Multiplexer, such as a Digital subscriber line access multiplexer, couples the modem, such as an Digital subscriber line modem, to the Ethernet aggregation network. The modem being coupled to the Access Multiplexer over at least one ATM connection.

Within such an Ethernet aggregation network consisting of a Digital Subscriber Line Access Multiplexer DSLAM Service and Edge Nodes, the Edge node is only addressable by one single Ethernet address and a corresponding IP address. The Host Terminal sends an Address Resolution Protocol request, further referred to an ARP-request, for the Ethernet-address, of the edge Node. The modem forwards the ARP-request over the ATM connections, having a different Quality of Service QOS, further referred to as QOS, where the request includes the IP-address of the edge node. The edge node then sends an ARP reply, further referred to as an ARP-reply, including an Ethernet-address of the edge node. Subsequently the modem receives the Address Resolution Protocol reply which contains the Ethernet-address of the edge node on an ATM connection having the certain QOS class and stores the address together with an identification of this connection whereon the ARP-reply was received in a table. For sending data towards the edge node using the Ethernet-address of the edge node, the modem determines the corresponding connection based on the Ethernet-address of the edge node from the table. Such a table may contain only one row for each Ethernet-address, as this should be a unique relationship.

Hence, only one class of QoS for a service can be selected per edge node. So for providing a user terminal, coupled via a modem to the DSLAM, with different services each having a different QoS class it is necessary to use a different edge node for each QoS class. This can be realised by using different physical ports with corresponding different MAC-addresses on the same service edge or using different service edges. However, a different edge node for differentiating between QoS classes is too expensive because of the use of different edge nodes, and results in inefficient use of resources. Moreover this implementation is not flexible.

An object of the present invention is to provide a method for establishing a path, with a certain QOS class, between a modem and a edge node over a communications network of the above known type and a related access multiplexer but wherein it is possible to address a single edge node in such way that separate connections having different QOS classes between a modem and a single edge node can be established.

Indeed, by at first intercepting, by the access Multiplexer, the ARP-request sent by host terminal and forwarded by the modem and subsequently assigning, by the access multiplexer, a chosen address for the edge node based on information in the ARP request on the selected edge node, i.e. the IP address, that is included in the ARP-request and finally including, by the access multiplexer, this chosen address in the ARP reply, to be send on the connection with the correct QoS, the modem is able to retrieve this chosen address and to link it to an identifier of the connection whereon the ARP-reply is received.

At sending of data-packets by the modem the chosen Ethernet address is used for selecting an ATM connection having a certain QOS class, however as this address is a chosen address within the access multiplexer, this chosen address is to be replaced by the access multiplexer with the effective address of the addressed edge node. The effective address is the Ethernet address of this edge node as this address known within the Ethernet network required for forwarding data-packets towards the edge node. The quality of service-class QOS-class is selected based on the IP address.

At sending of data-packets by the edge node and destined to the host terminal, the effective address is replaced by the chosen address in order to forward the datapackets via the modem towards the host terminal. This in order to keep relation between the ethernet addresses and the connection identifiers consistent.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
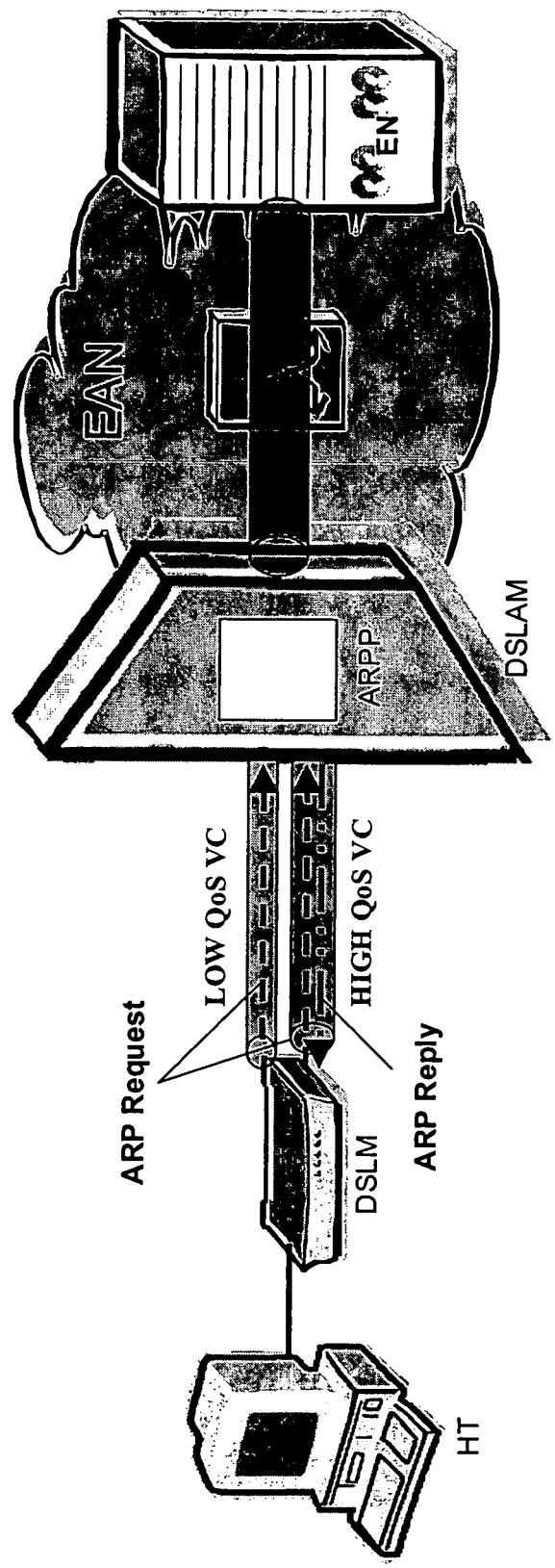
FIG. 1 represents a communications network CN wherein the present invention is implemented.
Figure 2:
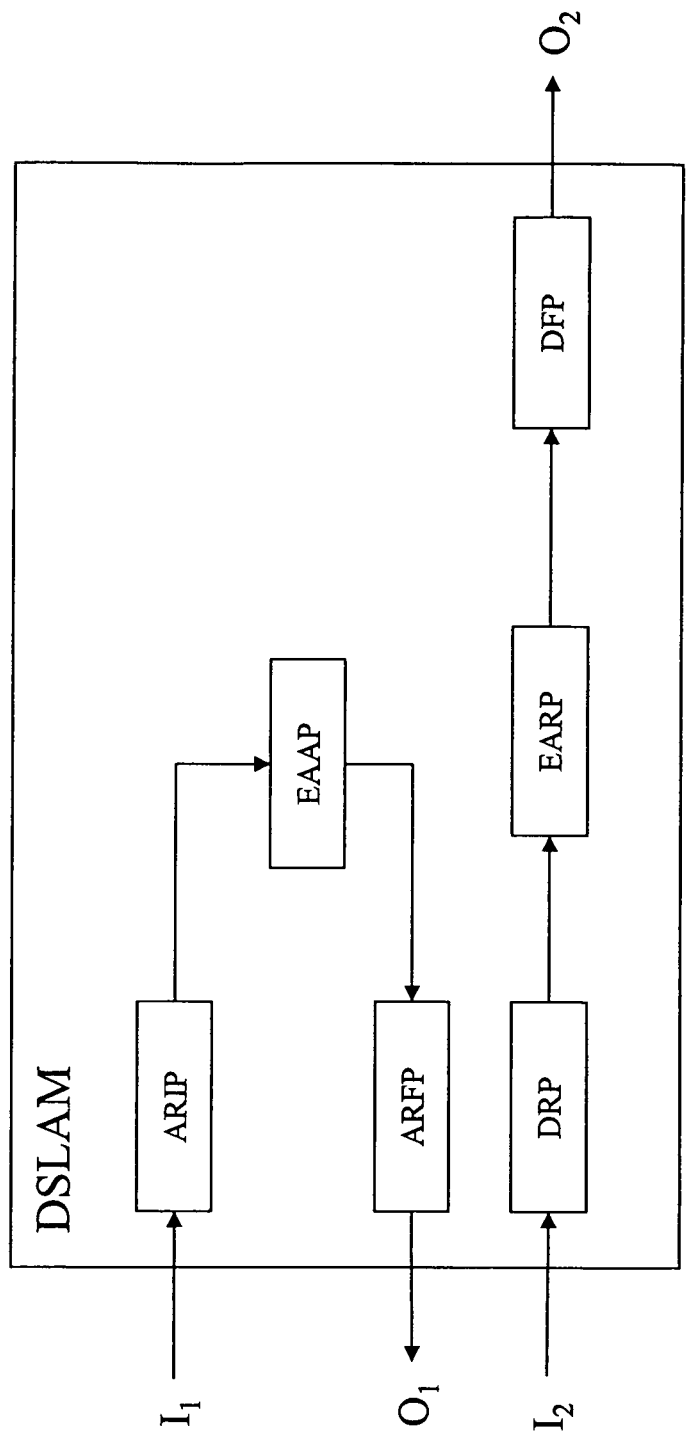
FIG. 2 represents the access multiplexer DSLAM as presented in FIG. 1.

In the following paragraphs, referring to the drawings, an implementation of the method for establishing a path, having a certain QOS-class and the access multiplexer according to the present invention will be described. In the first paragraph of this description the main elements of the communications network as presented in FIG. 1 are described. In the second paragraph, all connections between the before mentioned elements and described means are defined. Subsequently all relevant functional means of the mentioned call server as presented in FIG. 2 are described followed by a description of all interconnections. In the succeeding paragraph the actual execution of the method for session establishment is described.

Such a communications network CN comprises a large number of host terminals and Digital subscriber line modems however in order to keep simplicity in this description it is chosen to only present one host terminal HT and only one and Digital subscriber line modem DSLM, further referred to as DSL modem. Moreover, this communications network CN comprises an Digital subscriber line access Multiplexer DSLAM for multiplexing the data of a number of modems to one data-stream and an Ethernet aggregation network for multiplexing the data of a number of Digital subscriber line access Multiplexer DSLAM. Finally there is an edge Node EN for connecting the host terminal to service provider.

The Digital subscriber line access Multiplexer DSLAM couples the DSL modem to the Ethernet aggregation network EAN. The DSL modem in its turn is coupled to the Digital subscriber line Access Multiplexer DSLAM over at least one ATM connection LowQos VC, High Qos VC and the host terminal HT is coupled to the DSL modem DSLM over an ethernet connection. The edge node EN is coupled to the Digital subscriber line access Multiplexer DSLAM over Ethernet connections through the Ethernet aggregation network EAN. The Digital subscriber line access Multiplexer DSLAM of the present invention, as presented in FIG. 2 comprises an ARP request intercepting part ARIP that is adapted to intercept the an ARP request sent by a the host terminal and forwarded by the modem and an Ethernet address assigning part EAAP that is able to assign a chosen address for an said edge node based on information on said edge node contained in said ARP request, i.e. the IP address of the edge node EN and. The Digital subscriber line access Multiplexer DSLAM further comprises an ARP reply forwarding part ARFP that is able to generate and forward an ARP reply containing the assigned address of the edge node towards the DSL modem.

Moreover, the Digital subscriber line access Multiplexer DSLAM comprises a Data-packet reception part DRP for receiving data-packets to be multiplexed and subsequently to be forwarded, an Ethernet address replacement part EARP that is adapted to, at reception of a data-packet sent by the DSL modem and destined to the edge node EN, to replace the chosen address with the real Ethernet address of the edge node EN and the Digital subscriber line access Multiplexer DSLAM comprises a Data-packet forwarding part for forwarding data-packets based on this real Ethernet address towards its destination. On reception of Data-packets from the Edge node the real Ethernet address has to be replaced by the chosen Ethernet address based on the QoS determined by the setting of the P-bits of the Edge Node.

The ARP request intercepting part ARIP has an input-terminal that is at the same time input $I_1$ of the Digital subscriber line access Multiplexer DSLAM. The ARP request intercepting part ARIP is further coupled with an output to an input of the Ethernet address assigning part EAAP which in its turn is coupled with an output to an input of the ARP reply forwarding part ARFP. The ARP reply forwarding part ARFP has an output-terminal that is at the same time an output-terminal $O_1$ of the Digital subscriber line access Multiplexer DSLAM.

The Data-packet reception part DRP has an input-terminal that is at the same time input $I_2$ of the Digital subscriber line access Multiplexer DSLAM. The Data-packet reception part DRP is further coupled with an output to an input of the Ethernet address replacement part EARP which in its turn is coupled with an output to an input of the ARP reply forwarding part ARFP. The Data-packet forwarding part DFP has an output-terminal that is at the same time an output-terminal $O_2$ of the Digital subscriber line access Multiplexer DSLAM. In order to explain the operation of the present invention, at first it is assumed that the host terminal HT already obtained an IP-address of an edge node EN, for a specific QoS, he is going to contact. However, the Ethernet address is not presently available yet at the host terminal. This Ethernet address can be obtained by sending an Address Resolution Protocol request towards the DSL modem that in its turn forwards the ARP-request over the ATM-connections LowQos VC, High Qos VC towards the edge node EN. The ARP request intercepting part ARIP of the Digital subscriber line Access Multiplexer DSLAM however intercepts the ARP-request sent by the modem and forwards the request to the Ethernet address assigning part EAAP that subsequently assigns a chosen address for the edge node based on the IP-address of this edge node that is included in the ARP request. The ARP reply forwarding part ARFP of the Digital subscriber line access Multiplexer DSLAM then generates and forwards an ARP-reply, instead of the edge node EN, which contains the assigned address of the edge node EN, towards the DSL modem. The ARP-reply is forwarded. The connection whereon the ARP-reply is forwarded is selected based on the IP address of the edge node EN. The DSL modem DSLM then receives the ARP-reply that contains the assigned address of the edge node (EN) on the ATM connection, which is characterised by a certain QOS class. Subsequently, the DSL modem DSLM retrieves the assigned address and stores the address together with an identification of the ATM connection, i.e. the VC of the ATM connection. In this way a number of different assigned Ethernet addresses together with a VC, identifying connections with a predefined quality of service class QOS class, can be stored in a table of the DSL modem.

At sending of data-packets by the host terminal HT, the DSL modem determines, based on the Ethernet address contained in the data-packet and the addresses stored in the table, the ATM-connection identified by the VC whereon the data-packets are to be forwarded. Because there are different assigned Ethernet addresses identifying the edge node, different connections can be established. Each of these connections have a different QOS-class. Hence, different connections having a different QOS-class can be established between the host terminal and the edge node.

Furthermore, the received data-packets containing the assigned Ethernet address of the edge node EN are received by the Data-packet reception part DRP of the digital subscriber line access Multiplexer DSLAM, subsequently are forwarded to the Ethernet address replacement part EARP that at reception of a data-packet sent by the DSL modem and destined to the edge node EN, replaces the assigned address with the real Ethernet address of the edge node EN. Additionally the Ethernet address replacement part EARP sets the correct P-bits corresponding to the required QoS-class of the connection. These P-bits are required for forwarding the data-packets with the correct QoS through the Ethernet aggregation network EAN.

For datapackets received from the edge node EN and destined to the host terminal a reverse Ethernet Address replacement part replaces the real address with the corresponding assigned Ethernet address of the edge node EN this in order to keep the relationship between the ethernet-address and the connection identifier stored in the modem DSLM consistent.

The data-packet is forwarded by the Data-packet forwarding part based on this real Ethernet address and the P-bits towards its destination, the Edge Node EN, over a connection having a certain predefined QOS-class.

The final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for establishing a path, having a certain quality of service (QOS) class, between a modem and an edge node over a communications network, said communications network comprising an Access Multiplexer and an Ethernet aggregation network, said Access Multiplexer coupling said modem to said Ethernet aggregation network, and said modem being coupled to said Access Multiplexer over at least one asynchronous transfer mode (ATM) connection, said method comprising the steps of:

a. said modem forwarding an address resolution protocol (ARP) request, received from a host terminal, for an address of said edge node, over an ATM connection of said at least one ATM connection, said ATM connection having a certain QOS-class;
 b. said modem receiving an ARP reply containing said address of said edge node on said ATM connection of said at least one ATM connection having a certain QOS class; and
 c. said modem retrieving said address and storing said address together with an identification of said connection;
 d. said Access Multiplexer intercepting said ARP request forwarded by said modem;
 e. said Access Multiplexer assigning a chosen address for said edge node based on information on said edge node contained in said ARP request; and
 f. said Access Multiplexer including said chosen address in said ARP reply.

2. The method for establishing a path, having a certain QOS-class according to claim 1, further comprising the step of at reception, by said access multiplexer of a data-packet sent by said modem and destined to said edge node, replacing said chosen address with an effective address of said edge node.

3. The method for establishing a path, having a certain QOS-class according to claim 2, wherein said method further comprises the step of at reception, by said access multiplexer of a data-packet sent by said edge node and destined to said modem, replacing said effective address with an chosen address of said edge node.

4. An Access Multiplexer for establishing a path, having a certain quality of service (QOS) class, between a modem and an edge node over a communications network, said communications network comprising said Access Multiplexer and an Ethernet aggregation network, said Access Multiplexer coupling said modem to said Ethernet aggregation network, and said modem being coupled to said Access Multiplexer over at least one asynchronous transfer mode (ATM) connection, said Access Multiplexer comprising:

an address resolution protocol (ARP) intercepting part which intercepts an ARP request forwarded by said modem;
 an Ethernet address assigning part which assigns a chosen Ethernet address for said edge node based on information on said edge node in said intercepted ARP request; and
 an ARP reply forwarding part which generates and forwards an ARP reply containing the chosen Ethernet address of said edge node to said modem,
 wherein the chosen Ethernet address for said edge node is different from a real Ethernet address of said edge node, and
 wherein said modem forwards said ARP request over said at least one ATM connection between the modem and the Access Multiplexer and receives said ARP reply on an ATM connection of said at least one ATM connection, said ATM connection having a certain QOS class which depends on the chosen Ethernet address of said edge node.

5. The Access Multiplexer according to claim 4, further comprising an Ethernet address replacement part which, at reception of a data-packet sent by said modem and destined to said edge node, replaces said chosen address with an effective address of said edge node.

6. The Access Multiplexer according to claim 5, further comprising a reverse Ethernet address replacement part which, at reception of a data-packet sent by said edge node and destined to said modem, replaces said effective address with said chosen address of said edge node.

7. The method for establishing a path, having a certain QOS-class according to claim 1, wherein the chosen address assigned by said Access Multiplexer is generated by the Access Multiplexer.

8. The method for establishing a path, having a certain QOS-class according to claim 1, wherein the chosen address assigned by said Access Multiplexer is an address other than an effective address of the edge node.

9. The method for establishing a path, having a certain QOS-class according to claim 1, wherein the information on said edge node contained in said ARP request is an Internet protocol address of said edge node.

10. An Access Multiplexer for establishing a path, having a certain quality of service (QOS) class, between a modem and an edge node over a communications network, said communications network comprising said Access Multiplexer and an Ethernet aggregation network, said Access Multiplexer coupling said modem to said Ethernet aggregation network, and said modem being coupled to said Access Multiplexer over at least one asynchronous transfer mode (ATM) connection, said Access Multiplexer comprising:

an address resolution protocol (ARP) intercepting part which intercepts an ARP request forwarded by said modem;
 an Ethernet address assigning part which assigns a chosen Ethernet address for said edge node based on information on said edge node in said intercepted ARP request; and
 an ARP reply forwarding part which generates and forwards an ARP reply containing the chosen Ethernet address of said edge node to said modem,
 wherein said ARP request is received by said modem from a host terminal for an address of said edge node over said at least one ATM connection having a certain QOS class,
 wherein said modem receives said ARP reply packet containing said chosen address of said edge node on said at least one ATM connection having a certain QOS class, and
 wherein said modem retrieves said chosen address from the ARP reply packet and stores said chosen Ethernet address with an identification of said ATM connection.

* * * * *